US008287230B2

(12) United States Patent
Hurst, Jr. et al.

(10) Patent No.: US 8,287,230 B2
(45) Date of Patent: Oct. 16, 2012

(54) FIXED AND VARIABLE COMPRESSOR SYSTEM CAPACITY CONTROL

(75) Inventors: Ernest P. Hurst, Jr., Powder Springs, GA (US); Hung M. Pham, Dayton, OH (US)

(73) Assignee: Emerson Climate Technologies Retail Solutions, Inc., Kennesaw, GA (US)

(*) Notice: Subject to any disclaimer, the term of this patent is extended or adjusted under 35 U.S.C. 154(b) by 0 days.

(21) Appl. No.: 12/885,778

(22) Filed: Sep. 20, 2010

(65) Prior Publication Data
US 2011/0008181 A1 Jan. 13, 2011

Related U.S. Application Data

(63) Continuation of application No. 11/086,787, filed on Mar. 22, 2005, now Pat. No. 7,918,655.

(60) Provisional application No. 60/567,171, filed on Apr. 30, 2004.

(51) Int. Cl.
F04B 49/00 (2006.01)
(52) U.S. Cl. ............... 415/5; 417/426; 417/12; 417/216
(58) Field of Classification Search ........... 417/5, 199.1, 417/216, 226, 274, 53, 310, 426, 12
See application file for complete search history.

(56) References Cited

U.S. PATENT DOCUMENTS

| 5,265,434 A | 11/1993 | Alsenz |
| 5,440,891 A | 8/1995 | Hindmon, Jr. et al. |
| 5,586,444 A | 12/1996 | Fung |
| 6,047,557 A | 4/2000 | Pham et al. |
| 6,295,821 B1 | 10/2001 | Madigan |
| 6,332,327 B1 | 12/2001 | Street et al. |
| 6,360,553 B1 | 3/2002 | Singh et al. |
| 6,428,286 B1 | 8/2002 | Shimizu et al. |

(Continued)

FOREIGN PATENT DOCUMENTS
WO 9634238 A1 10/1996

OTHER PUBLICATIONS

Notification of First Office Action received from The Patent Office of the People's Republic of China dated Mar. 13, 2009 regarding Application No. 200580013707.5. Translation by CCPIT Patent and Trademark Law Office.

(Continued)

*Primary Examiner* — Ehud Gartenberg
*Assistant Examiner* — Vikansha Dwivedi
(74) *Attorney, Agent, or Firm* — Harness, Dickey & Pierce, P.L.C.

(57) ABSTRACT

A controller for a system having at least one variable-capacity, pulse-width modulated compressor and at least one fixed-capacity compressor is provided. The controller may include processing circuitry that modulates the at least one variable-capacity, pulse-width modulated compressor to any capacity substantially between ten percent capacity and one hundred percent capacity. The processing circuitry may determine a desired capacity of the at least one variable capacity, pulse-width modulated compressor based on a load sensor signal and a current run percentage of the at least one variable capacity, pulse-width modulated compressor and may toggle the at least one fixed-capacity compressor between a run mode and a shutdown mode based on the desired capacity of the at least one variable-capacity, pulse-width modulated compressor.

14 Claims, 12 Drawing Sheets

U.S. PATENT DOCUMENTS

| | | |
|---|---|---|
| 6,519,958 B1 | 2/2003 | Moon et al. |
| 6,601,397 B2 | 8/2003 | Pham et al. |
| 6,612,121 B2 | 9/2003 | Moon et al. |
| 6,637,222 B2 | 10/2003 | Moon et al. |
| 6,769,264 B2 | 8/2004 | Moon et al. |
| 6,868,685 B2 | 3/2005 | Kim |
| 6,997,002 B2 | 2/2006 | Moon et al. |
| 7,377,119 B2 | 5/2008 | Kim et al. |
| 7,918,655 B2 * | 4/2011 | Hurst et al. .................. 417/426 |
| 2002/0157409 A1 | 10/2002 | Pham et al. |

OTHER PUBLICATIONS

Non-Final Office Action mailed Aug. 24, 2009 for U.S. Appl. No. 11/086,787.

Final Office Action mailed Mar. 4, 2009 for U.S. Appl. No. 11/086,787.

Non-Final Office Action mailed Jul. 23, 2008 for U.S. Appl. No. 11/086,787.

Final Office Action mailed Jun. 1, 2007 for U.S. Appl. No. 11/086,787.

Non-Final Office Action mailed Sep. 12, 2006 for U.S. Appl. No. 11/086,787.

Preliminary Notice of Grounds for Rejection regarding Korean Patent Application No. 10-2006-7022700, dated Dec. 5, 2011. Translation provided by Y.S. Chang & Associates.

Supplementary European Search Report regarding Application No. 05738709.4/1751430, dated Mar. 20, 2012.

* cited by examiner

Compressor Efficiency Example

| Load (%) | Load (Kbtuh) | Fixed 1 | Fixed 2 | Variable | Notes |
|---|---|---|---|---|---|
| 10% | 8k | OFF | OFF | 8/45 = 18% | |
| 20% | 16k | OFF | OFF | 16/45 = 35% | 35% > 11% Therefore, Variable Alone is Preferred |
| | | ON | OFF | (20-15)/45 = 11% | |
| 30% | 24k | OFF | OFF | 24/45 = 54% | 54% > 20% Therefore, Variable Alone is Preferred |
| | | ON | OFF | (24-15)/45 = 20% | |
| 40% | 32k | OFF | OFF | 32/45 = 71% | 71% > 38% Therefore, Variable Alone is Preferred |
| | | ON | OFF | (32-15)/45 = 38% | |
| 50% | 40k | OFF | OFF | 40/45 = 90% | 90% > 55% Therefore, Variable Alone is Preferred |
| | | ON | OFF | (40-15)/45 = 55% | |
| | 45k | OFF | OFF | 100% | |
| 60% | 49k | ON | OFF | (49-15)/45 = 75% | |
| 70% | 57k | ON | OFF | (57-15)/45 = 93% | 93% > 80% Therefore, Combination of Variable and Fixed 1 is Preferred |
| | | OFF | ON | (57-21)/45 = 80% | |
| 80% | 65k | OFF | ON | (65-21)/45 = 98% | |
| 90% | 73k | ON | ON | (73-15-21)/45 = 82% | |
| 100% | 81k | ON | ON | 100% | |

FIG 10

FIXED AND VARIABLE COMPRESSOR SYSTEM CAPACITY CONTROL

CROSS-REFERENCE TO RELATED APPLICATIONS

This application is a continuation of U.S. patent application Ser. No. 11/086,787 filed on Mar. 22, 2005. This application claims the benefit of U.S. Provisional Application No. 60/567,171 filed on Apr. 30, 2004. The disclosures of the above applications are incorporated herein by reference.

FIELD

The present teachings relate to generally to compressor systems and, more specifically, to compressor system architecture and control.

BACKGROUND

Compressors are used in a wide variety of industrial and residential applications to circulate refrigerant within a refrigeration or heat pump system to provide a desired heating or cooling effect. Compressors are also used to inflate or otherwise impart a fluid force on an external object such as a tire, sprinkler system, or pneumatic tool. In any of the foregoing applications, it is desirable that a compressor provide consistent and efficient operation to ensure that the particular application (i.e., refrigeration system or pneumatic tool) functions properly. To that end, monitoring and controlling compressor performance helps ensures reliable and efficient compressor and system operation.

Scroll compressors are becoming more and more popular for use in refrigeration and heat pump applications due primarily to their capability of extremely efficient and consistent operation. Such compressors typically incorporate a pair of intermeshed spiral wraps that receive and compress a fluid. In operation, one of the spiral wraps is caused to orbit relative to the other so as to define one or more moving chambers, which progressively decrease in size as they travel from an outer suction port toward a center discharge port. As the moving chambers decrease in size, the fluid disposed therein becomes compressed prior to being expelled by the compressor through the discharge port. Typically, one of the scroll members is driven by an electrical motor disposed within an outer shell of the scroll compressor and is controlled by an external controller to regulate power to the motor. The electric motor, in conjunction with the controller, operates to drive the one scroll member via a suitable drive shaft to compress the fluid between the individual wraps upon demand.

Some scroll compressors are capable of adjusting capacity in response to fluctuating demand and generally referred to as "variable capacity" or "variable speed" scroll compressors. Variable capacity scroll compressors are adjusted through manipulation of the intermeshed spiral wraps such that the relative position between the individual wraps is varied and the volume of fluid disposed generally between each wrap is increased or decreased. Variable speed scroll compressors achieve a similar end, but do so without adjusting the relative position of the spiral wraps. The variable speed scroll compressor monitors system and/or compressor parameters and adjusts the speed of the electric motor that drives the orbiting spiral wrap accordingly. Such fluctuations in wrap speed affects the output of the compressor, and thus, varies the overall capacity.

In either of the foregoing variable scroll compressors, adjustment of the compressor capacity allows a system controller, such as a refrigeration system controller, to adjust the individual capacity of each scroll compressor to optimize the efficiency of the multiple-compressors rack system. For example, the controller is able to reduce capacity on a compressor if demand is decreasing, and thus, is able to reduce the energy consumed by the individual compressor. Such adjustments effectively tailor energy consumption for each compressor to only that which is minimally needed to run the system. Because the energy consumption of each variable scroll compressor may be varied, energy is regulated, and the overall system efficiency is improved.

In conventional refrigeration systems, a rack of scroll compressors may be grouped so as to function as a single unit and may provide a cooling effect to a plurality of refrigerators, refrigerator cases, or freezers. However, most compressors in a conventional rack are Fixed and their on/off cycling rate is limited by reliability requirements, thus reducing system efficiency. In any of the foregoing applications, the compressor bank generally includes a variable scroll compressor and at least one other fixed-capacity compressor. The capacity of the variable compressor may be adjusted to increase the system efficiency, as previously discussed, while the fixed scroll compressor includes a non-variable or fixed capacity.

A controller conventionally monitors the various refrigerated cases and determines an appropriate load for the system at a given time and sends a demand signal to the compressor rack accordingly. The demand signal instructs the variable compressor to operate at a particular output (i.e., one to one hundred percent of total capacity) and instructs the fixed compressor(s) to start up, continue, or shut down, depending on the state of the fixed scroll compressor at the time of instruction. While such controllers adequately control compressor capacity, such systems are limited to control of each individual scroll compressor and, therefore, are not capable of controlling a series of compressors linked in a parallel relationship.

While the controller may adequately instruct the variable compressor to function between zero and one hundred percent total capacity, the controller can only instruct the fixed controller to either start up or shut down, and therefore may instruct the rack to produce a higher capacity than required by the system. For example, if the requisite capacity calls for nine tons and the available compressors are a six ton variable scroll compressor, and two five ton fixed scroll compressors, the controller will instruct the variable compressor to run at one hundred percent and will instruct one of the fixed compressors to start up initially. However, at this point, the variable compressor is producing six tons and the fixed is producing five tons for a total of eleven tons. Therefore, the combination of the variable compressor at one hundred percent and the fixed compressor results in a two-ton overage, and thus, a loss in efficiency.

While the controller will eventually scale the capacity of the variable compressor so that the total output is nine tons, conventional controllers require sufficient time for the variable compressor to be scaled back, and therefore do not provide an optimum control algorithm. Because conventional controllers communicate with each compressor individually, overlap between compressor capacity occurs, and system efficiency is reduced.

SUMMARY

A controller for a system having at least one variable-capacity, pulse-width modulated compressor and at least one fixed-capacity compressor is provided. The controller may include processing circuitry that modulates the at least one variable-capacity, pulse-width modulated compressor to any capacity substantially between ten percent capacity and one hundred percent capacity. The processing circuitry may determine a desired capacity of the at least one variable capacity, pulse-width modulated compressor based on a load sensor signal and a current run percentage of the at least one variable capacity, pulse-width modulated compressor and may toggle the at least one fixed-capacity compressor between a run mode and a shutdown mode based on the desired capacity of the at least one variable-capacity, pulse-width modulated compressor.

A method is provided and may include monitoring an operating condition of a refrigeration system including at least one variable-capacity, pulse-width modulated compressor and modulating a capacity of the at least one variable-capacity, pulse-width modulated compressor based on the system operating condition. The method may further include instructing at least one fixed capacity compressor into a run mode when the variable-capacity, pulse-width modulated compressor is at approximately one hundred percent capacity for a predetermined time and instructing the at least one fixed-capacity compressor into a shutdown mode when the at least one variable-capacity, pulse-width modulated compressor is at approximately ten percent capacity for a predetermined time.

Further areas of applicability of the present teachings will become apparent from the detailed description provided hereinafter. It should be understood that the detailed description and specific examples, while indicating the preferred embodiment of the teachings, are intended for purposes of illustration only and are not intended to limit the scope of the teachings.

BRIEF DESCRIPTION OF THE DRAWINGS

The present teachings will become more fully understood from the detailed description and the accompanying drawings, wherein:

FIG. 10 is a graphical representation of compressor efficiency incorporating a variable scroll compressor and a pair of fixed scroll compressors;

DETAILED DESCRIPTION

The following description is merely exemplary in nature and is in no way intended to limit the teachings, application, or uses.

With reference to the figures, a compressor control system 200 will be described in two exemplary refrigeration systems 10, 110. However, it should be noted that the control system 200 of the present teachings could be utilized to control one or more variable compressors in a parallel relationship with at least one other fixed compressor to maintain a suction pressure set point in any other system.

Figure 1:
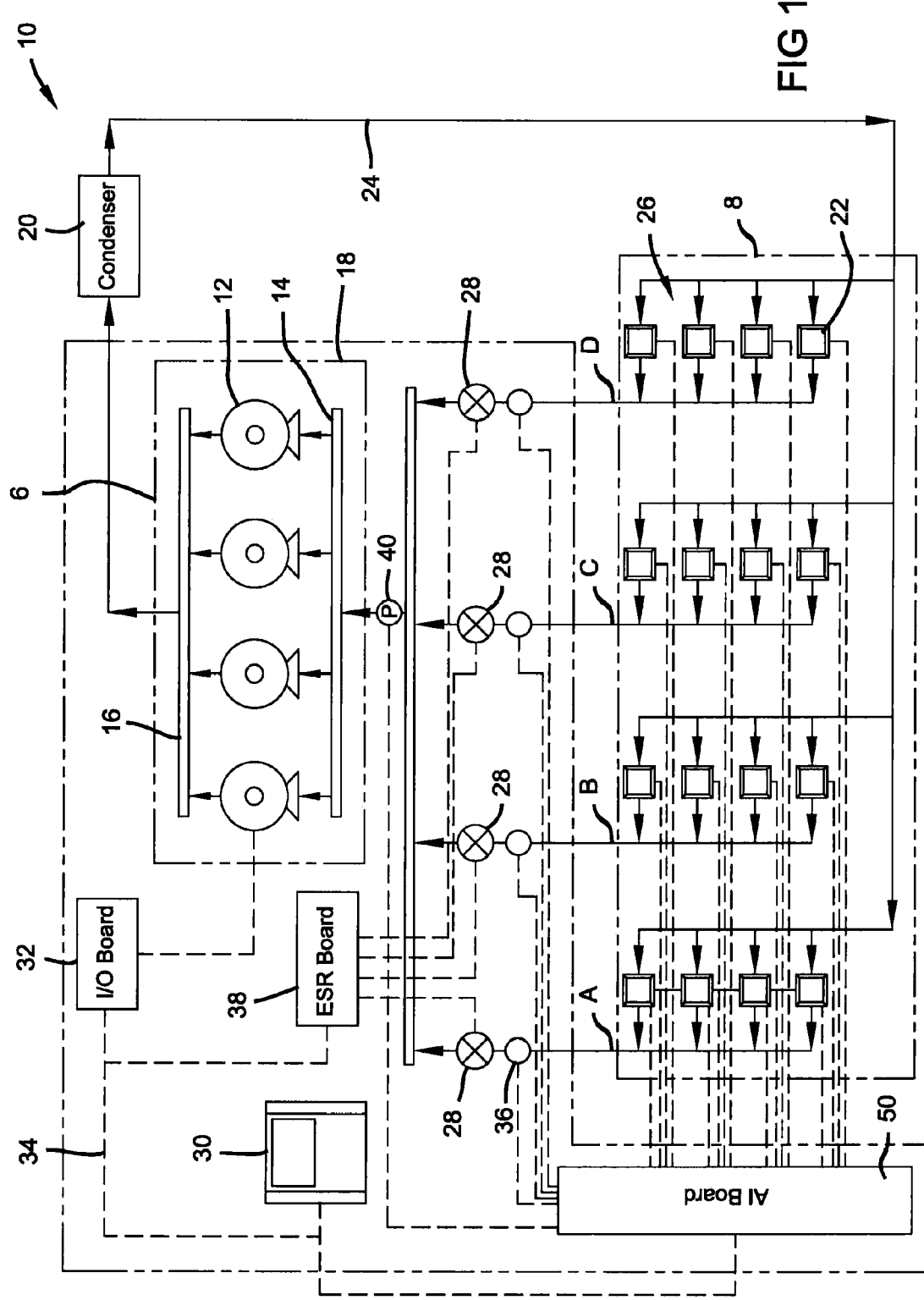
FIG. 1 is a schematic of a refrigeration system in accordance with the principles of the present teachings.

Referring to FIG. 1, a detailed block diagram of a refrigeration system 10 according to the present teachings includes a plurality of compressors 12 piped together in a compressor room 6 with a common suction manifold 14 and a discharge header 16 all positioned within a compressor rack 18. The compressor rack 18 compresses refrigerant vapor that is delivered to an outdoor condenser 20 where the refrigerant vapor is liquefied at high pressure. This high-pressure liquid refrigerant is delivered to a plurality of refrigeration cases 22 in a grocery store floor space 8 by way of piping 24.

Each refrigeration case 22 is arranged in separate circuits 26 consisting of a plurality of refrigeration cases 22 that operate within a similar temperature range. FIG. 1 illustrates four (4) circuits 26 labeled circuit A, circuit B, circuit C, and circuit D. Each circuit 26 is shown consisting of four (4) refrigeration cases 22. Those skilled in the art, however, will recognize that any number of circuits 26 within a refrigeration system 10, as well as any number of refrigeration cases 22, may be employed within a circuit 26. As indicated, each circuit 26 will generally operate within a certain temperature range. For example, circuit A may be for frozen food, circuit B may be for dairy, circuit C may be for meat, etc.

Because the temperature requirement is different for each circuit 26, each circuit 26 includes a pressure regulator 28, typically an electronic stepper regulator (ESR) or valve, which acts to control the evaporator pressure and, hence, the temperature of the refrigerated space in the refrigeration cases 22. Preferably, each refrigeration case 22 also includes its own evaporator and its own expansion valve (neither shown), which may be either a mechanical or an electronic valve for controlling the superheat of the refrigerant. In this regard, refrigerant is delivered by piping 24 to the evaporator in each refrigeration case 22.

The refrigerant passes through the expansion valve where a pressure drop occurs to change the high-pressure liquid refrigerant to a lower-pressure combination of liquid and vapor. As the warmer air from the refrigeration case 22 moves across the evaporator coil, the low-pressure liquid turns into a gas. This low-pressure gas is delivered to the pressure regulator 28 associated with that particular circuit 26. At the pressure regulator 28, the pressure is dropped as the gas returns to the compressor rack 18 through the common suction manifold 14. At the compressor rack 18, the low-pressure gas is compressed to a higher pressure and delivered to the condenser 20, which again creates a high-pressure liquid to start the refrigeration cycle over.

Figure 2:
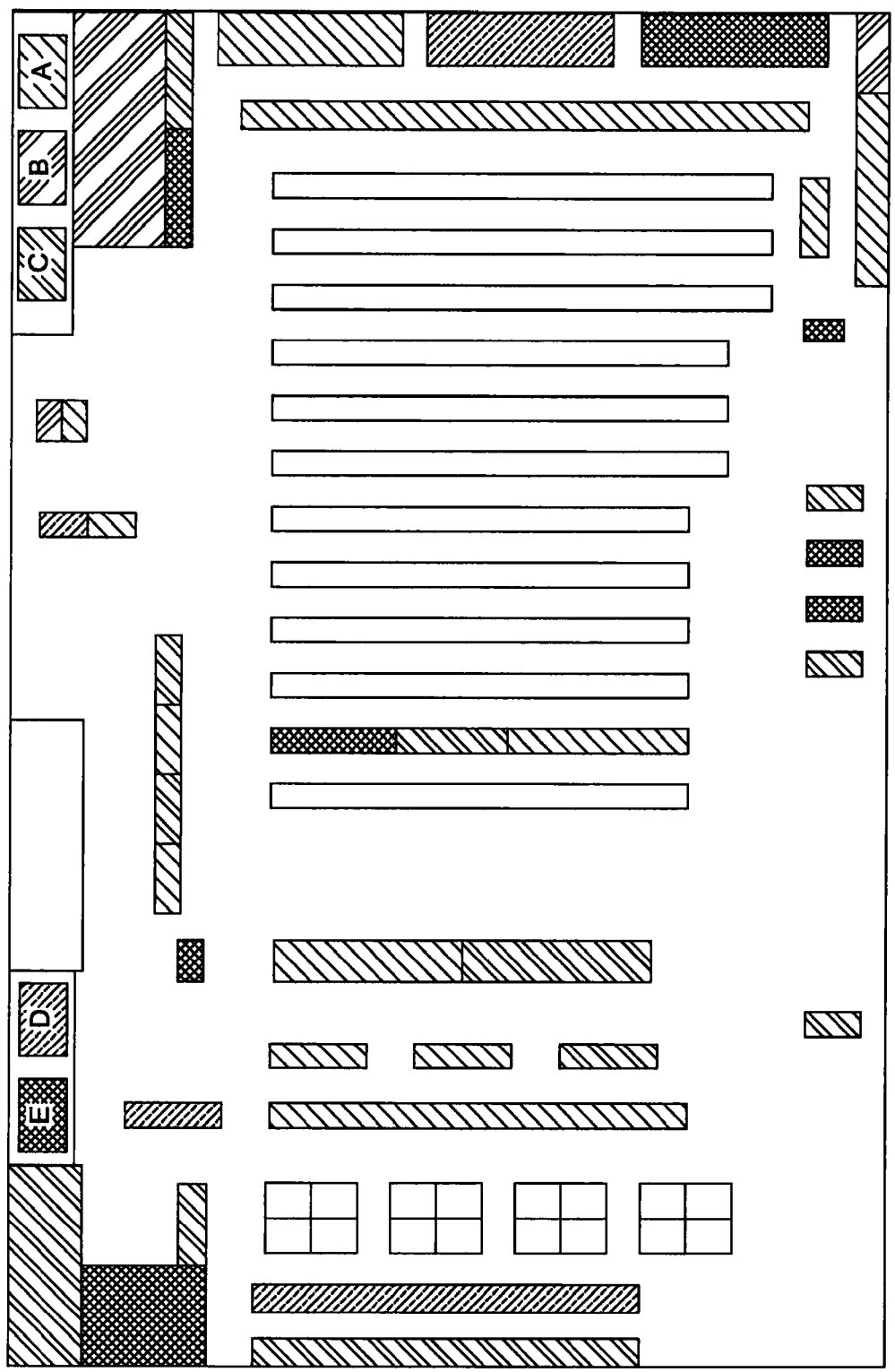
FIG. 2 is schematic of the refrigeration system of FIG. 1.

The arrangement for a cooling system, such as the refrigeration system described above, positions the compressor rack or multiple compressor racks at the rear of a retail outlet, or perhaps in the basement or a rooftop penthouse. In each scenario, the system requires suction and liquid piping throughout a store or building to feed refrigeration display cases, coolers and/or air conditioning systems. As best illustrated in FIG. 2, liquid and suction piping for each compressor rack A-E must be piped to the associated cases in its circuit (as indicated by cross-hatching). The system further includes a condenser, which is typically positioned outside the retail outlet and similarly requires piping to feed the refrigeration cases, coolers and/or air conditioning systems.

With reference to FIG. 1, communication and control wiring for each refrigeration case 22, pressure regulator 28, and sensors 36, 40 are supplied to an analog input board 50 or are received from an input/output board 32 or a driver board, such as ESR board 38, to optimize cooling system performance. For example, to control the various functions of the refrigeration system 10, a main refrigeration controller 30 controls the operation of each pressure regulator (ESR) 28, as well as the suction pressure set point for the entire compressor rack 18. A separate case controller may be used to control the superheat of the refrigerant to each refrigeration case 22 through an electronic expansion valve in each refrigeration case 22 by way of a communication network or bus.

Further, in order to monitor the suction pressure for the compressor rack 18, a pressure transducer 40 is preferably positioned at the input of the compressor rack 18 or just past the pressure regulators 28. The pressure transducer 40 delivers an analog signal to an analog input board 38, which measures the analog signal and delivers this information to the main refrigeration controller 30, via the communication bus 34. Also, to vary the openings in each pressure regulator 28, the electronic stepper regulator (ESR) board 50 drives up to eight (8) electronic stepper regulators 28. The ESR board 38 includes eight (8) drivers capable of driving the stepper valves 28, via control from the main refrigeration controller 30.

With reference again to FIG. 1, the suction pressure at the compressor rack 18 is dependent on the temperature requirement for each circuit 26. For example, assume circuit A operates at ten degrees F., circuit B operates at 15 degrees F., circuit C operates at twenty degrees F., and circuit D operates at 25 degrees F. The suction pressure at the compressor rack 18, which is sensed through the pressure transducer 40, requires a suction pressure set point based on the lowest temperature requirement for all the circuits 26, which, for this example, is circuit A, or the lead circuit. Therefore, the suction pressure at the compressor rack 18 is set to achieve a 10 degrees F. operating temperature for circuit A, which is able to operate most efficiently with a nearly one hundred percent open pressure regulator 28. Because each circuit 26 is operating at a different temperature, however, the pressure regulators 28 in circuits B, C and D are closed a certain percentage for each circuit 26 to control the corresponding temperature for that particular circuit 26. To raise the temperature to 15 degrees F. for circuit B, the stepper regulator valve 28 in circuit B is closed slightly, the valve 28 in circuit C is closed further, and the valve 28 in circuit D is closed even further providing for the various required temperatures.

Figure 3:
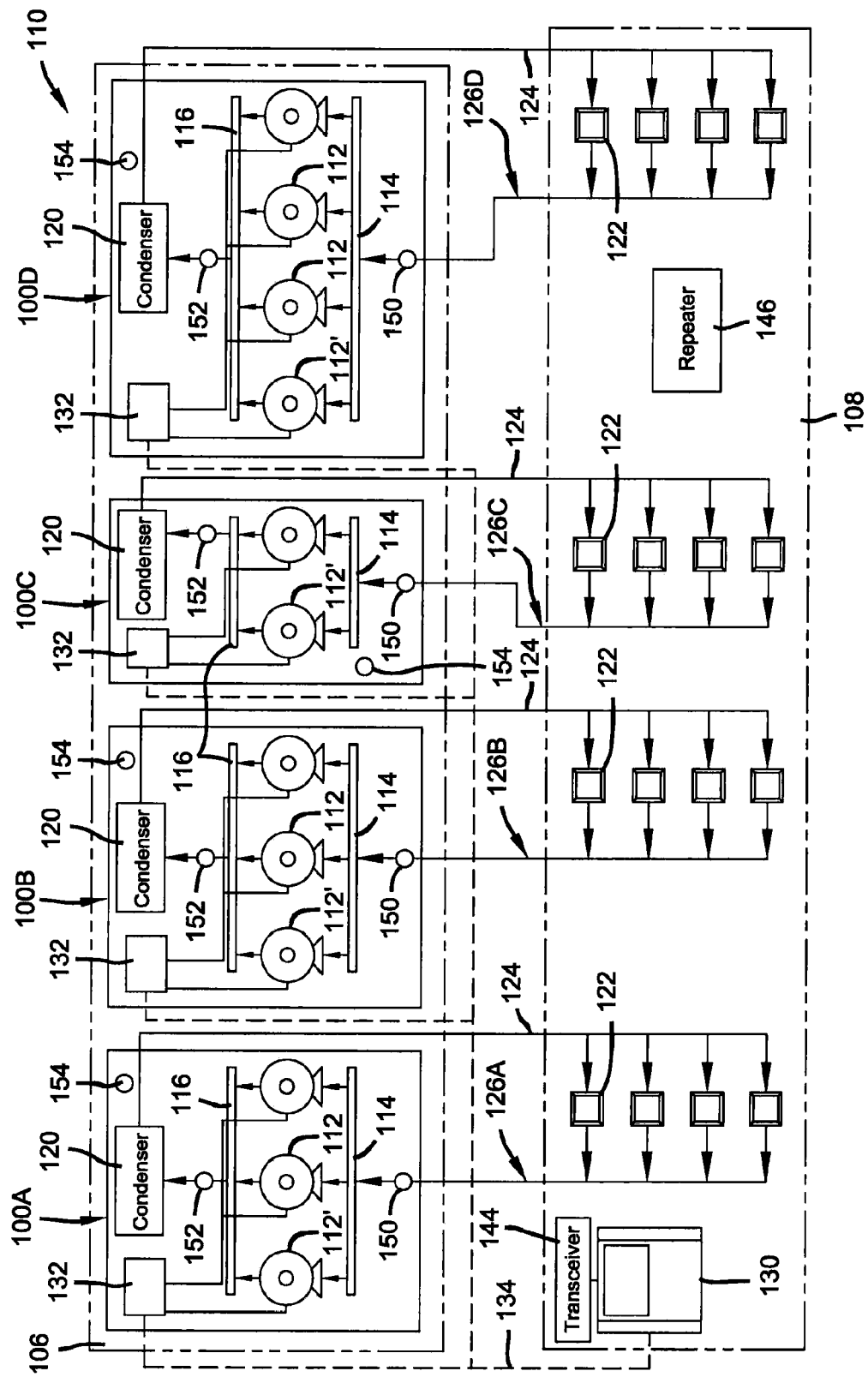
FIG. 3 is a schematic of another refrigeration system according to the present teachings.

Referring to FIG. 3, another refrigeration system 110 according to the present teachings includes a plurality of rooftop units 100A-D, each piped to a respective refrigeration circuit 126A-D. Refrigeration system 110 is preferably of the type disclosed in assignee's commonly-owned U.S. Pat. Application No. 60/553,056, filed on Mar. 15, 2004, the disclosure of which is incorporated herein by reference.

Each rooftop unit 100 includes a plurality of compressors 112, a condensing unit 120 and a controller 132, collectively mounted to or on a housing for the rooftop unit 100. The compressors 112 are piped together with a common suction manifold 114 and a discharge header 116 to provide compressed refrigerant to the condensing unit 120, where the refrigerant vapor is liquefied at high pressure. Piping 124 for each refrigeration circuit 126A-D delivers the high pressure liquid refrigerant to a plurality of refrigeration cases in a retail outlet floor space 108. The rooftop units 100 are disposed on a rooftop space 106.

Each refrigeration case 122 is arranged in separate circuits 126 including a plurality of refrigeration cases 122 operating within a similar temperature range and connected by piping 124 to a respective rooftop unit 100. FIG. 3 illustrates four circuits 126 labeled circuit 126A, circuit 126B, circuit 126C and circuit 126D. Each circuit 126 is shown to include four refrigeration cases 122, but those skilled in the art will recognize that refrigeration system 110 may include any number of circuits 126, and each circuit 126 may include any number of refrigeration cases 122. Each circuit 126 will generally operate within a certain temperature range. For example, circuit 126A may be for frozen food, circuit 126B may be for dairy, circuit 126C may be for meat, etc. Because the temperature requirement is different for each circuit 126, each is independently piped to a rooftop unit 100 via piping 124. For example, circuit 126A is plumbed to rooftop unit 100A, likewise for circuit 126B and rooftop unit 100B, etc.

By distributing the capacity to deliver high-pressure liquid refrigerant, and independently piping each circuit 126 to operate within a certain temperature range, certain efficiencies are gained and expenses avoided. For example, there is no need for a pressure regulator 28 to control the evaporator pressure and, hence, the temperature of the refrigerated space in the refrigeration cases 22 for a conventionally arranged refrigeration circuit 26. Further, due to the distributed arrangement of the rooftop units 100, the condensing units 120 are installed integrally with the compressors 112 in the rooftop unit 100, thereby ensuring piping and wiring to factory specifications.

The distributed arrangement of a single refrigeration circuit 126 per rooftop unit 100 provides the same capacity control of parallel compressor operation that the central plant architecture provides, but does so with significantly reduced piping and refrigerant requirements and much higher efficiency due to elimination of ESR and use of shorter lines (less pressure drop). The distributed arrangement also reduces the initial construction costs to the retail outlet owner, as well as shortened construction due to the simplified arrangement. Over the life of the system, it reduces energy consumption and refrigeration quantity.

Figure 4:
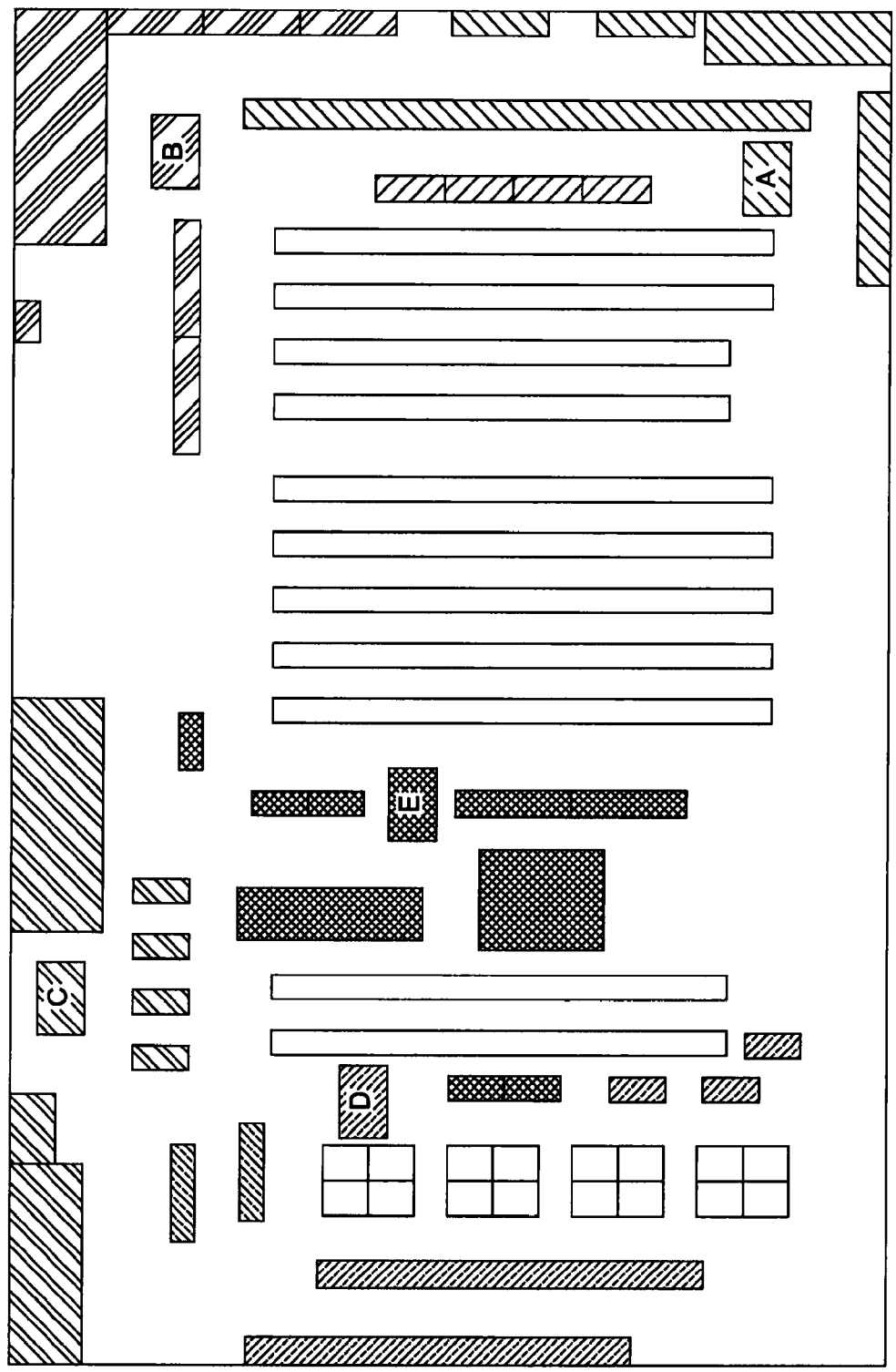
FIG. 4 is a schematic of the refrigeration system of FIG. 3.

As illustrated in FIG. 4, by distributing compressor capacity via the rooftop units 100, shorter runs of piping and wiring are required as the rooftop units 100 are disposed on the retail outlet roof at a convenient location near where the refrigeration circuits 126 are disposed within the retail outlet. Further, this rooftop arrangement of multiple smaller rooftop units 100 saves cost over the central plant approach, which often requires a large central penthouse weighing upwards of 40,000 to 50,000 pounds and requiring extensive steel structure to support the weight, or requires significant space within the retail outlet and extensive field piping to condensers mounted on raised steel platforms on the roof of the retail outlet. By comparison, the rooftop units 100 with integrated compressor 112, condenser 120 and controllers 132, weigh approximately 1,000 to 3,000 pounds, which, once optimally located, will not require additional structure and typically require only increasing girder beam and joist size. Compared to the total additional structural cost of approximately $25,000 per unit for a penthouse for a central plant approach, the additional structural cost of the distributed approach is approximately $700 per unit.

The efficiencies gained by the distributed architecture begin with the construction, which can be accomplished in a shorter period of time as the condensers 120 are piped and wired at a manufacturing facility and the rooftop units 100 are disposed proximate the refrigeration circuits 126 they serve. This arrangement not only shortens installation time, but reduces the labor costs associated with the piping installation. Further, the cost of the piping (particularly as the cost of copper piping has increased over recent years), hangers and insulation decreases as less is required for the shorter runs between the rooftop units 100 and the refrigeration circuits 126. Further, because of the shorter runs, there is a lower refrigerant requirement, helping retail outlet owners meet increasingly stringent environmental protection standards. In terms of operating efficiency, reduced suction line pressure loss and greater energy efficiency is achieved as a direct result of the shorter pipe runs and targeted operating temperature provided by the arrangement of the rooftop unit 100 for each refrigeration circuit 126.

As with a conventional system, high-pressure liquid refrigerant is delivered to each refrigeration case 122 within its respective refrigeration circuit 126. The refrigeration case 122 includes an evaporator (not shown) and expansion valve (not shown), which may either be a mechanical or electronic valve for controlling the superheat of the refrigerant. Refrigerant is delivered by piping 124 to the evaporator in each refrigeration case 122 where the refrigerant passes through the expansion valve, and drops in pressure to change the high pressure liquid refrigerant to a lower pressure combination of liquid and vapor. As the warmer air from the refrigeration case 122 moves across the evaporator coil, the low-pressure liquid returns to a gas, which is delivered to the common suction manifold 114 for the compressors 112 within the rooftop unit 100. As before, the compressors 112 compress the low pressure gas to a higher pressure and deliver the high-pressure gas to the condenser 120, which again creates a high-pressure liquid to begin the refrigeration cycle again.

Figure 5:
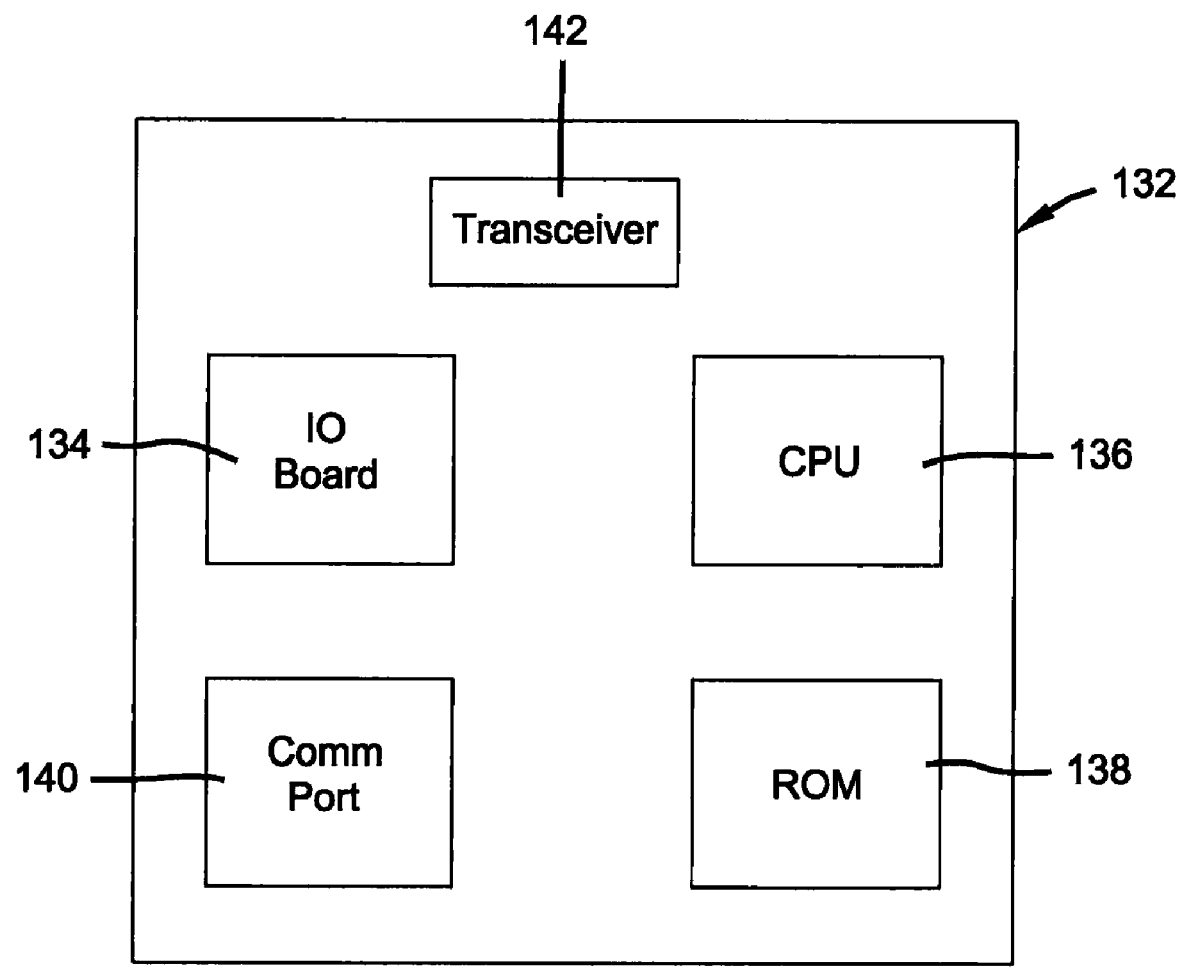
FIG. 5 is a block diagram of a controller according to the present teachings.
Figure 6:
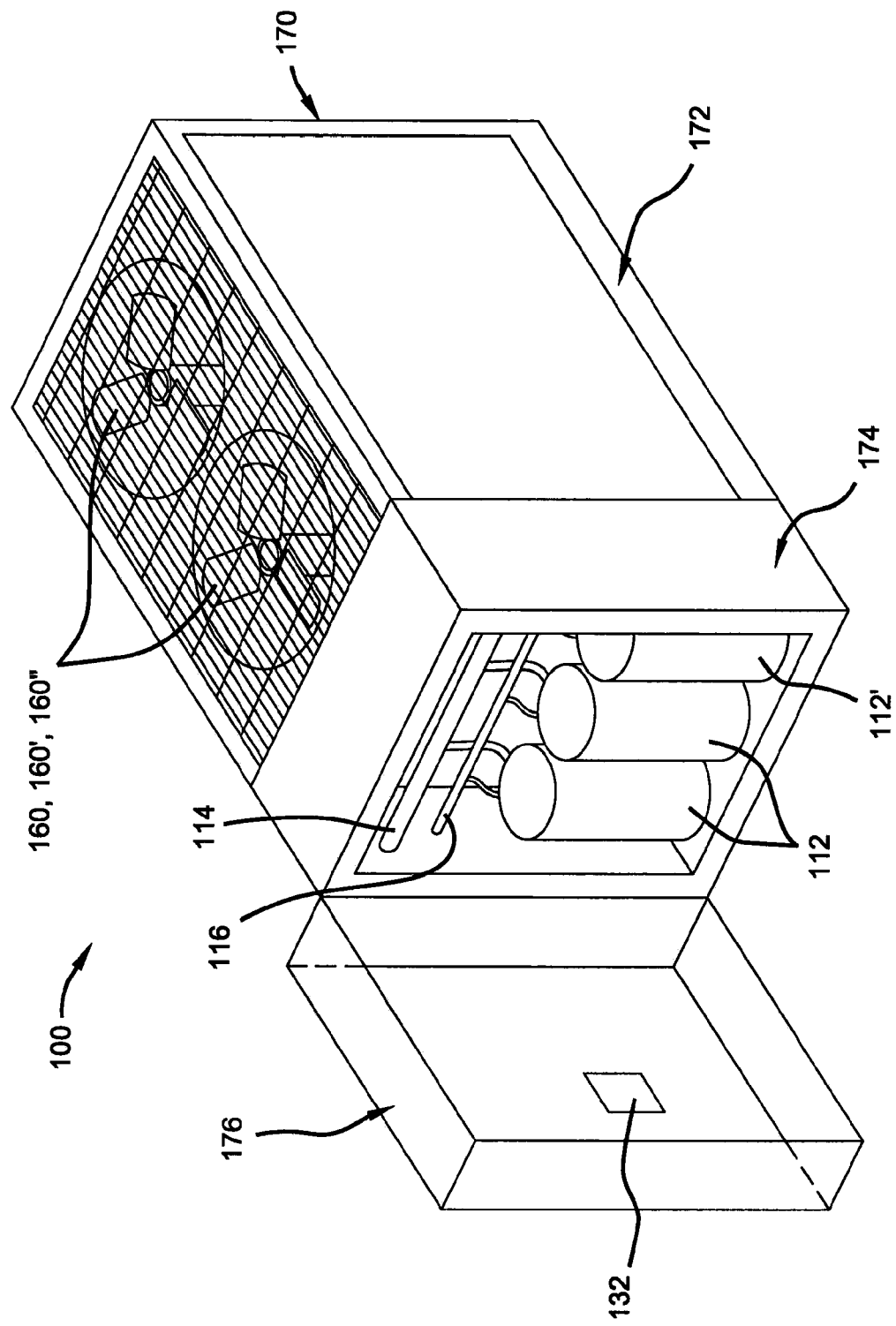
FIG. 6 is a perspective view of a rooftop unit according to the present teachings.

The controller 132 of the rooftop unit 100 includes an input/output board 134, a microprocessor 136, memory 138, and a communication port 140, as best shown in FIG. 5. The controller 132 is mounted on the outer housing of the rooftop unit 100, as best shown in FIG. 6. The controller 132 controls compressor capacity and also a variable speed fan of the condensing unit 120 and communicates through communication bus 134 via the communication port 140.

The refrigeration system 110 further includes a refrigeration controller 130, which is in communication with the controllers 132 of the various rooftop units 100. Preferably, the refrigeration controller 130 is an Einstein area controller offered by CPC, Inc., of Atlanta, Ga., or any other type of controller that may be programmed.

In one variation of the teachings, the rooftop unit controllers 132 may include operating algorithms stored in memory 138 for compressor capacity and condenser fan control, which programs are executed by the processor 136, as will be described below. The controller 132 then communicates operating status and measured parameter data to the main refrigeration controller 130 via communication port 140, which may be connected to communication bus 134, as will be described further below. Such communication is typically wired, but may more efficiently be accomplished using a wireless communication protocol.

For wireless communication, each rooftop unit controller 132 may include a transceiver 142 (as shown in FIG. 5) for transmitting and receiving wireless signals. The main refrigeration controller 130 similarly may include a transceiver 144 for transmitting and receiving signals. Each transceiver 142, 144 may include a transmitter and receiver capable of receiving and sending radio frequency (RF) parametric data. Further, each transceiver 142, 144 may include a signal conditioning circuit. The transceiver may be a stand-alone device positioned independently of the rooftop unit controller 132 or refrigeration controller 130. Further, the refrigeration system 110, depending on distance and the communication environment, may require one or more RF repeaters 146 to overcome a limited transmission range. In this case, each repeater 146 acts as a bridge between the transceiver 142 of the controller 132 and the transceiver 144 of the main refrigeration controller 130.

The controller 132 controls rooftop unit 100 based on set points established within the refrigeration controller 130. Because the controller 132 is configured with a RAM chip, microprocessor, and flash memory, it performs all control functions even when communication to the refrigeration controller 130 is lost. Furthermore, this same configuration allows the controller 132 to download the most recent control set points to the refrigeration controller 130 after communication is re-established. Similar to the refrigeration controller 130, the controller 132 has various memory chips that are pre-programmed with default set points. The controller 132 is capable of operating the associated rooftop unit 100 as soon as the controller 132 has been wired to the rooftop unit 100 and is receiving input data. Set points may also be altered at any time from a hand-held terminal and are valid until a connection between the controller 132 and the refrigeration controller 130 is made. The controller 132 monitors input data from sensors connected directly to it, and receives additional input data routed to the refrigeration controller 130 from sensors connected to other controllers or input boards.

Each rooftop unit 100 includes one or more compressors 112 depending on the required capacity for the refrigeration circuit 126 to which it is piped. Further, each rooftop unit 100 includes at least one variable capacity compressor 112'. Thus, if the rooftop unit 100 includes a single compressor 112, it is a variable capacity compressor 112'. Where the rooftop unit 100 includes two, three, four or more compressors 112, at least one of the compressors 112 is a variable capacity compressor 112'.

Variable capacity compressors 112', such as that disclosed in U.S. Pat. Nos. 6,120,255; 6,213,731; and U.S. patent application Ser. No. 10/619,767, each of which is expressly incorporated herein by reference, allow efficient and accurate matching of compressor output to required circuit capacity.

The controller 132 uses a pressure measurement from a transducer 150 on the suction side of the compressor 112 to compare to a user defined set point. Through a PID comparison of the pressure measurement and the set point, the controller 132 selects compressor staging, as will be described further below.

The controller 132 also controls fan speed for condensing unit 120 for scheduling, logging, and monitoring. The controller 132 supports three basic cooling strategies: (1) air cooling; (2) evaporation; and (3) temperature difference. For each of these strategies, the controller 132 uses PID control to a user-defined set point to control operation of the fan.

For air cooling, multiple fans 160 may be used, in which case they are sequenced based on the cooling required. The sequence can be controlled to equalize run time among the several fans 160. The amount of cooling necessary is determined by comparing the pressure on the discharge side (as measured by transducer 152) of the compressor and the user-defined set point. A variable speed fan 160' may be used, and the controller 132 sets the speed of the fan 160' based on the same comparison. Also, a two-speed fan 160" can be used, in which case the controller 132 selects the speed based on the cooling required, as derived from the same comparison.

For evaporative cooling of the condensing unit 120, the controller 132 operates a water valve (not shown) based on the required cooling of a condensing unit 120. Further, the controller 132 operates a fan 160 for evaporation of the cooling water over the condenser coils, and may be further fitted with a damper (no shown), whose opening is varied by the controller 132. Again, to determine the amount of cooling required, a compressor discharge pressure measurement from transducer 152 is difference compared to a user-defined set point.

For the temperature strategy for condensing unit 120, the controller 132 takes the difference between an ambient temperature measurement from ambient temperature sensor 154 and a discharge pressure measurement from transducer 152. The difference is converted to temperature. While the temperatures being compared are different for this approach, cooling is typically air-cooling but could alternatively be evaporative.

With reference to FIG. 6, the rooftop unit 100 includes a housing lens 70 divided into a condensing unit cabinet 172, a compressor cabinet 174, and an electronic cabinet 176. The condensing unit cabinet 172 houses the condensing unit 120 and condenser fans 160. The compressor cabinet 174 houses one or more compressors 112, 112', as well as the section manifold 114 and discharge header 116. The electronic cabinet 176 encloses the controller 132 in an enclosure accessible from the exterior of the housing 170. At least one of the compressors 112 may be a variable compressor 112'. Further, while a pair of condenser fans 160 are shown, one or more condenser fans 160 may be provided, and condenser fans 160 may be variable speed condenser fans 160' or two-speed condenser fans 160".

With particular reference to FIGS. 7-12, compressor control system 200 will be described in detail. The compressor control system 200 may be used with either of the foregoing refrigeration systems 10, 110, but will be described in association with refrigeration system 110 hereinafter.

The compressor control system 200 includes the controller 132 and an integrated digital control module (IDCM) 202. The controller 132 and IDCM 202 cooperate to control the fixed compressors 112 based on the capacity of the variable or digital compressors 112'.

Figure 7:
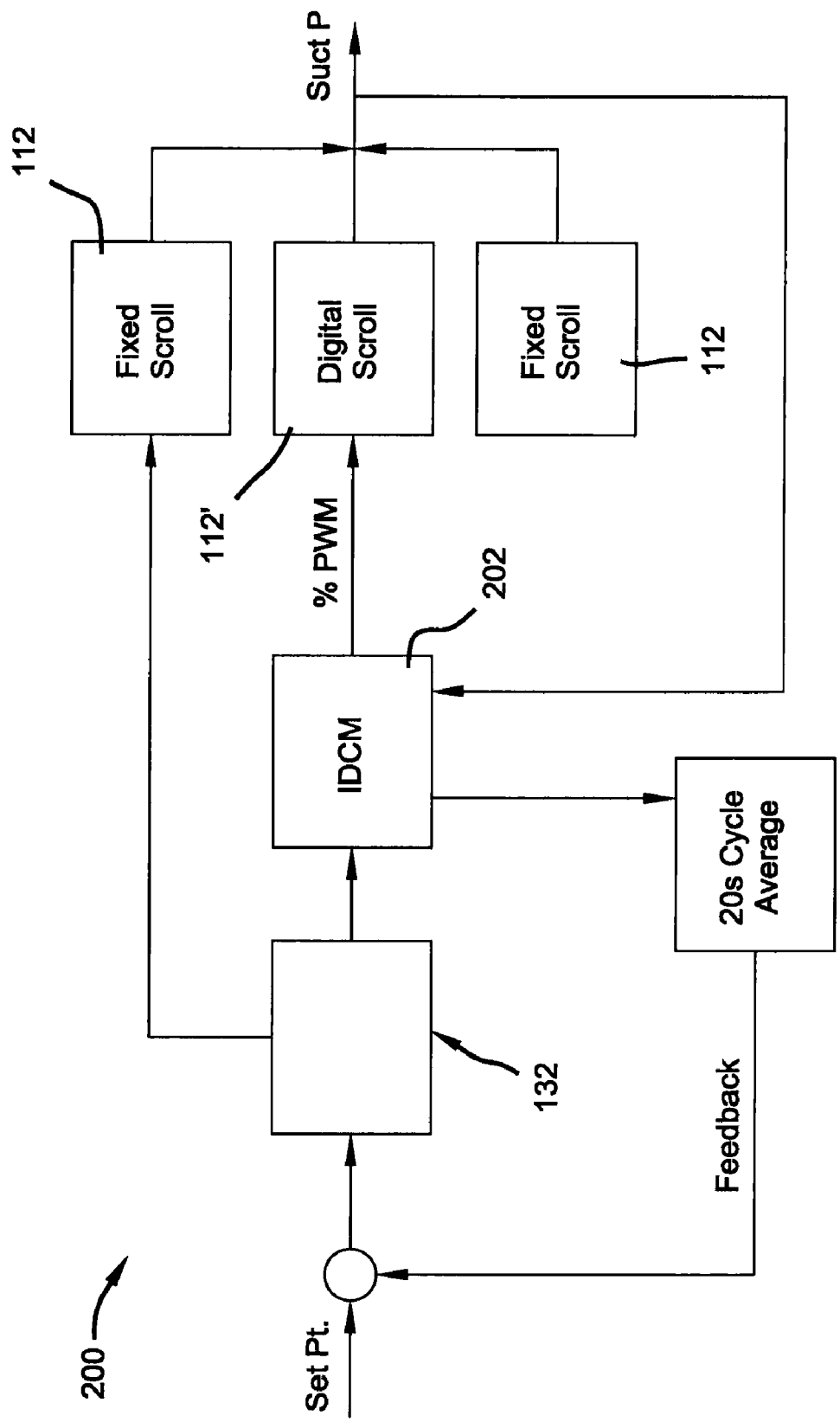
FIG. 7 is a schematic of a compressor control system for use with the refrigeration systems of FIGS. 1 and 3.

FIG. 7 depicts the IDCM 202 in communication with the controller 132 and a variable scroll compressor 112'. The controller 132 receives a set point from an external source such as a thermostat in a refrigerated display case 122, indicating that the case 122 is either above or below a predetermined temperature. As can be appreciated, if the case 122 is outside of a predetermined temperature range, the compressors 112, 112' are required to either increase capacity or decrease capacity in an effort to increase or reduce a supply of refrigerant to the case 122.

The controller 132 incorporates processing circuitry using PID (Proportional-Integral-Derivative) or other "fuzzy logic" to determine the run percentage of the variable compressor 112' (i.e., between zero percent and one hundred percent total capacity) in response to the received set point, whereby the PID output is a capacity percentage needed to achieve the set point. Such PID or "fuzzy logic" is preferably of the type disclosed in assignee's commonly-owned U.S. Pat. No. 6,601,397, the disclosure of which is incorporated herein by reference. While PID and "fuzzy logic" are disclosed, it should be understood that any mathematical analog capable of calculating an error between the set point and the control value (i.e., run percentage of the variable compressor 112') to thereby change the capacity of the variable compressor 112' to reach the set point, is anticipated, and should be considered as part of the present teachings.

In addition to using the set point in determining run percentage for the variable compressor 112', the controller 132 also receives the current operating condition (i.e., percentage of total capacity used) of the variable compressor 112' from the IDCM 202. The IDCM 202 monitors the suction pressure of the variable compressor 112' to determine the operating condition of the variable compressor 112' to ensure the compressor 112' is capable of increasing capacity. The IDCM 202 essentially interprets a signal from the variable compressor 112' and outputs a pulse indicative of the compressor run percentage back to the controller 132. While the IDCM 202 is described as a separate module, the system 200 may alternatively incorporate the function of IDCM 202 directly into the controller 132 to thereby simplify the system 200.

The IDCM 202 monitors the variable compressor 112' for a predetermined period of time to ensure that the readings are accurate and indicative of true compressor operating conditions. The variable compressor 112' does not have a consistent suction pressure during operation due to the fluctuating needs of the refrigeration system. Therefore, taking the suction pressure reading over a period of time provides the controller 132 with an average suction pressure for the variable compressor 112' and, in most cases, a more reliable indicia of compressor performance.

For example, FIG. 7 depicts a control loop having a feedback cycle of approximately twenty seconds. This means that the IDCM 202 monitors suction pressure of the variable compressor 112' and returns an average suction pressure value to the controller 132 every twenty seconds. Once the controller 132 receives the operating condition (i.e., average suction pressure) of the variable compressor 112', the controller 132 analyzes the run percentage of the compressor 112' in light of the set point or demand. It should be understood that while the control loop has been described as being twenty seconds in duration, that the control loop may be adjusted for the particular application and may even take an instantaneous reading of compressor suction pressure. In such as situation, the IDCM 202 continually feeds compressor run percentage data back to the controller 132 for continual analysis.

Once the controller 132 receives the updated variable compressor data from the IDCM 202, the controller 132 compares the average run percentage of the variable controller against the requisite set point. If the run percentage is deficient such that an increase in capacity is required, the controller 132 increases the capacity of the variable scroll compressor 112' to ensure that the set point can be met. If, for example, the set point required cannot be accommodated by the variable compressor 112' alone, the controller will initiate one of the fixed compressors 112 to take up the slack.

Figure 8:
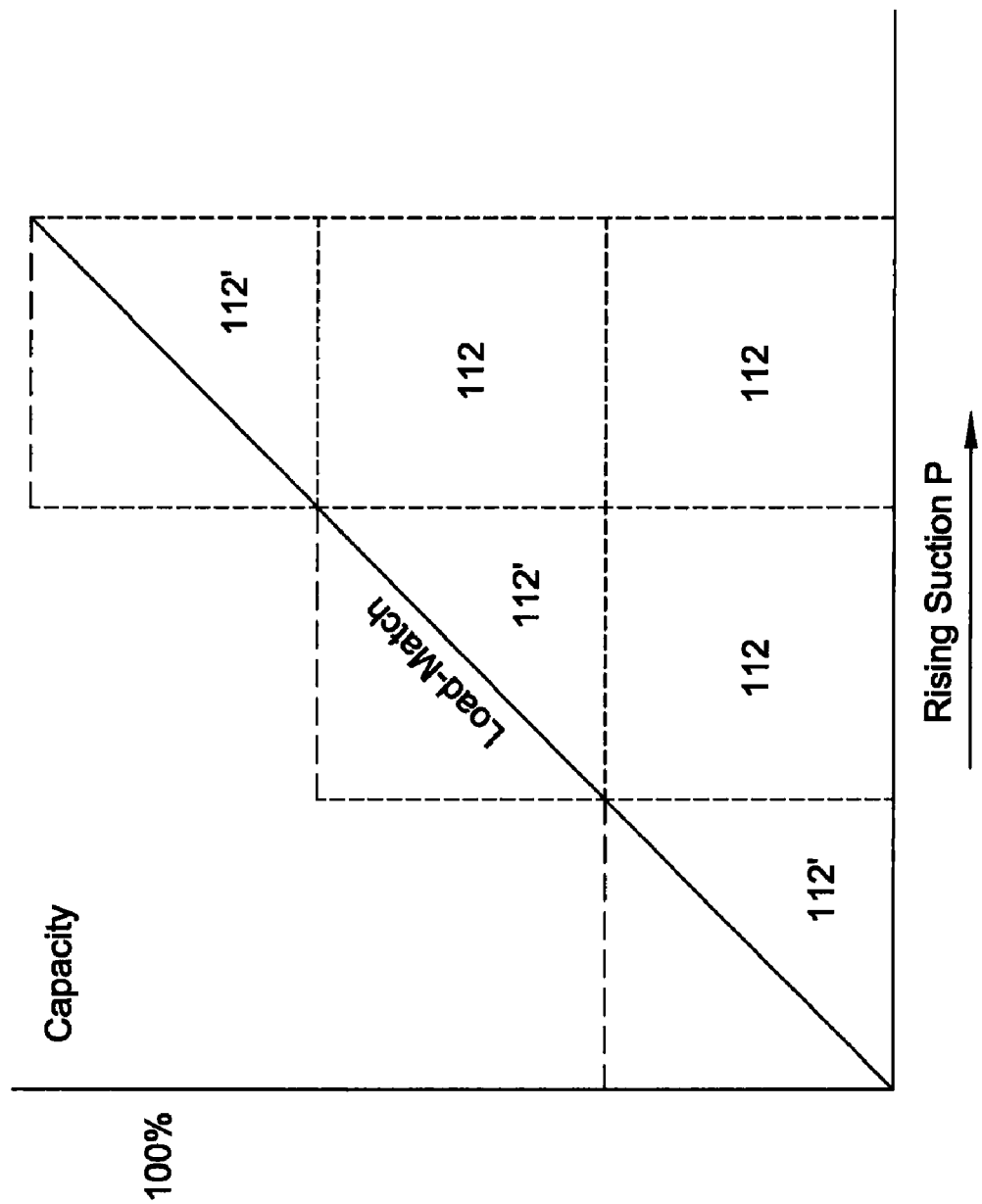
FIG. 8 is a graphical representation of compressor staging as a function of capacity and rising suction pressure.

When the load is increasing, and the PID reaches one hundred percent capacity for the variable compressor 112', the smallest fixed compressor 112 will be initiated to provide the additional capacity. As shown in FIG. 8, the relationship between operation of the variable compressor 112' at one hundred percent capacity and the initiation of the fixed compressor 112 is generally linear. In this manner, as suction pressure is rising, demand is increasing, and therefore, capacity must be increased.

For example, if the variable scroll compressor 112' for a particular rack 18 is a six horsepower compressor and there are additionally two fixed compressors 112 at four horsepower and five horsepower, respectively, the total capacity for the rack 18 is 15 horsepower (i.e., the sum of the variable and fixed compressor capacities). Therefore, if the demand is less than six horsepower, the variable scroll compressor 112' will be the only compressor running. However, if the demand exceeds six horsepower, the lowest fixed compressor 112 will be initiated by the controller 132. It should be noted that the determination to initiate a fixed compressor 112, for use in conjunction with the variable compressor 112', is determined based on the run percentage of the variable scroll compressor 112' over a predetermined time, as previously discussed.

If the demand required by the refrigeration system 10, 110 is seven horsepower, the controller 132 will initiate the four horsepower fixed compressor 112 to provide the additional capacity. The controller 132 will initiate the fixed compressor 112 based on the variable compressor 112' running at one hundred percent capacity for a predetermined amount of time. At this point, if the variable compressor 112' is running at one hundred percent capacity, and the fixed compressor is at four horsepower, a total capacity of ten horsepower is provided. Therefore, the ten horsepower provided exceeds the requisite demand of seven horsepower by three horsepower.

The additional three horsepower capacity contributes to system inefficiency as more energy is used than is required by the demand. Therefore, once the controller 132 determines that the variable compressor 112' is running at one hundred percent capacity for a predetermined time, the PID will adjust the run percentage of the variable compressor 112' to a lower value based on the size of the compressor and the demand prior to initiating the four horsepower fixed compressor 112. The fixed compressor 112 is not initiated until the run percentage of the variable compressor 112' is reduced.

Because variable speed compressors 112' may be controlled to provide only a percentage of their horsepower, they can be used to fine tune capacity when combined with fixed compressors to find the closest match for the desired percentage. Fixed compressors 112, however, are treated as digital switches. When the compressor 112 is staged on, the output is set to high. Therefore, the fixed compressors 112 are only able to run at one hundred percent or at zero percent (i.e., shutdown). For this reason, the fixed compressor 112 in the above example will provide four horsepower upon initiation. Therefore, the reduction in run percentage of the variable compressor 112' prior to initiating the fixed compressor 112 will result in a total capacity provided equaling seven horsepower.

Because the run percentage of the variable compressor 112' controls fixed-compressor initiation, the controller 132 is able to initiate the fixed compressor 112 at the exact time the variable compressor 112' is sufficiently reduced. In the above example, if the reduced run percentage requires the variable six horsepower compressor 112' to run at fifty percent capacity (i.e., three horsepower), and it takes a few seconds for the fixed compressor 112 to reach an output of four horsepower, the controller 132 can initiate the fixed compressor 112 prior to the variable compressor reaching fifty percent capacity. Therefore, when the variable compressor 112 reaches fifty percent capacity, the fixed compressor 112 is at one hundred percent capacity and providing four horsepower of performance. Therefore, the respective refrigeration system 10, 110 receives a compressor capacity of seven horsepower exactly matching demand, and the overall efficiency of the system is optimized.

The six horsepower variable compressor 112' will continue to run at the fifty percent reduced capacity until the controller 132 updates the run percentage via the PID or "fuzzy logic" algorithm. The controller 132 modulates the variable compressor 112' between ten percent and one hundred percent to match capacity load while the fixed four horsepower compressor 112 continues to run. However, once the variable compressor 112' falls to ten percent capacity for twenty seconds, the controller 132 will shut down the fixed compressor 112 and the PID will increase the run percentage of the variable compressor 112' accordingly. It should be noted that the time of twenty seconds is an adjustable parameter, and may be increased or reduced, based on the particular system 10, 110.

As with the addition of a fixed compressor 112, the controller 132 is similarly able to shutdown a fixed compressor 112 and ramp up the run percentage of the variable compressor 112' without disrupting the system 10, 110. For example, if the variable compressor 112' is running at ten percent capacity (for a predetermined time), the controller 132 will instruct the compressor 112' to ramp up, as the fixed compressor 112 is shutdown. The ramping of the variable compressor 112' accommodates for the reduction in capacity provided by the fixed compressor 112 and can be orchestrated to reach a desired capacity percentage just as the fixed compressor 112 reaches zero percent capacity.

For example, if the demand is reduced to three horsepower, the variable six horsepower compressor 112' will run at ten percent capacity and indicate to the controller 132 that the four horsepower fixed compressor 112 should be shutdown. The controller 132, using PID or "fuzzy logic" will instruct the variable compressor 112' to increase run percentage to fifty percent (i.e., three horsepower) and will instruct the fixed compressor 112 to shut down such that the variable compressor 112' reaches the fifty percent capacity mark just as the fixed compressor 112 reaches zero percent capacity. Therefore, the respective refrigeration system 10, 110 receives a compressor capacity exactly matching demand, and the overall efficiency of the system is optimized.

It should be noted that the same sequence would apply to each additional compressor added. For example, if the demand required exceeded ten horsepower, the third (next-larger) fixed five horsepower compressor 112 would be initiated and the PID would regulate the run percentage of the variable compressor 112' accordingly, as previously discussed. The third fixed compressor 112 is only initiated, therefore, when the four horsepower fixed compressor 112 is running and the variable compressor 112' is at one hundred percent capacity for a predetermined time. At this point, the controller 132 initiates the additional fixed compressor 112 to provide the requisite capacity to the system 10, 110. While a three compressor system is disclosed, it should be understood that the control system 200 of the present teachings could be used in a system having a variable compressor 112' and a plurality of fixed compressors 112 in a parallel relationship.

Figure 9:
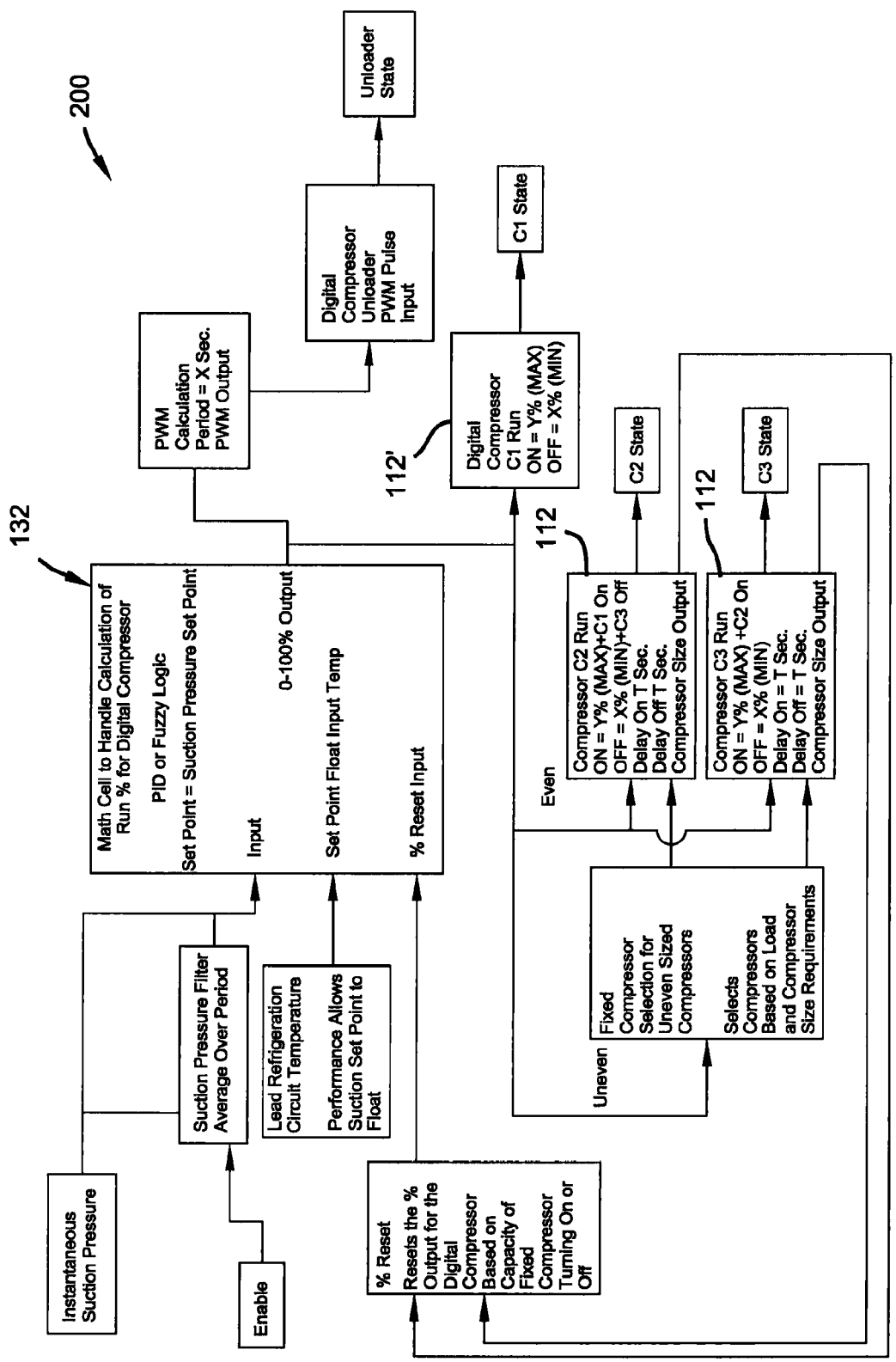
FIG. 9 is a schematic of a compressor control system for use with the refrigeration systems of FIGS. 1 and 3.
Figure 11:
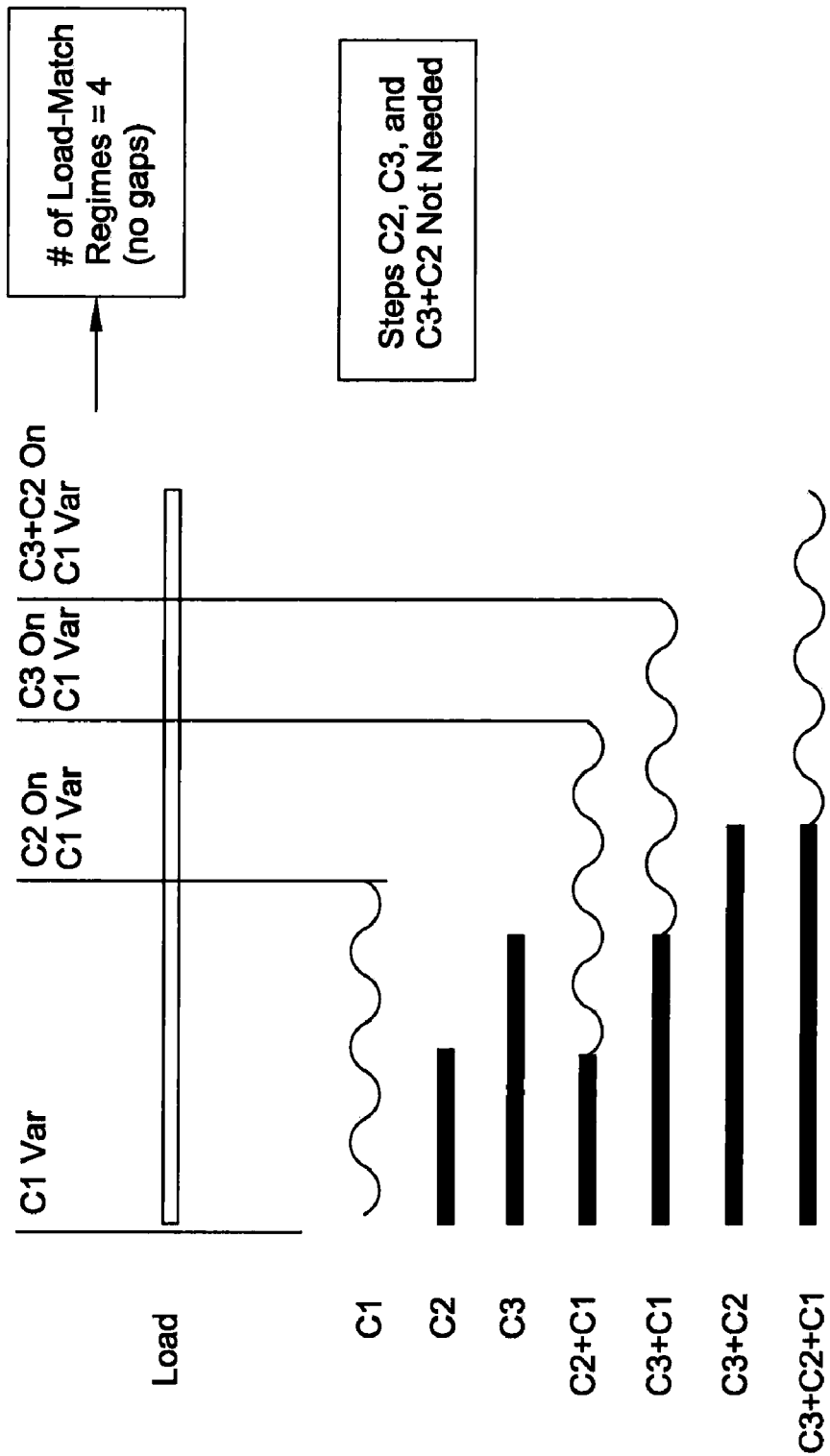
FIG. 11 is a graphical representation illustrating capacity steps versus load for a variable compressor and a plurality of lower-capacity, fixed compressors.

With particular reference to FIGS. 9-10, a generic control scheme is provided for use with the refrigeration systems 10, 110. In the example, a variable capacity scroll compressor 112' is schematically shown in a parallel relationship with two fixed scroll compressors 112. The variable compressor 112' includes a higher capacity than either of the fixed compressors 112 so that the variable compressor 112' is able to handle the capacity requirements when additional fixed compressors 112 are added or removed (i.e., during transitions), as illustrated in FIG. 11. While a fixed scroll compressor 112 is disclosed, it should be understood that the fixed compressors 112 may alternatively be fixed-reciprocating compressors, and should be considered as part of the present teachings. The reciprocating compressors 112 may provide additional capacity by incorporating a blocked-suction unloader that selectively adjusts the capacity of the compressor 112. Specifically, the blocked-suction unloader allows the compressor 112 to run at two different capacities, and therefore, one reciprocating compressor, incorporating a blocked-suction unloader, is generally equivalent to having two additional fixed compressors 112.

As shown in FIG. 9, the controller 132 receives instantaneous suction pressure data from the variable compressor 112' as well as system parameters such as refrigerated case temperature. The inputs to the controller from the variable compressor 112' and the respective refrigeration systems 10, 110 are used by the controller 132 to determine a set point suction pressure for the variable compressor 112'. Specifically, the controller 132 uses PID or "fuzzy logic" to determine a run percentage for the variable compressor 112' based on the system demand and current run percentage of the variable compressor 112'. It should be noted that while the refrigerated case temperature is disclosed as being an input to the controller 132, that other system operating conditions, such as refrigerant flow or air flow sensors, indicative of system operating conditions, are anticipated, and should be considered as part of the present teachings.

Once the new run percentage is determined by the controller 132, the control algorithm will modulate (PWM) the variable compressor 112' from ten percent to one hundred percent within a user defined time, as best shown in FIG. 9. The PWM is input into the variable compressor 112' to manipulate an unloader and set the relative position between the scrolls of the compressor 112' to thereby set the capacity of the compressor 112' as required. At this point, the relative position between the scrolls of the variable compressor 112' remain set relative to one another until the control module 132 receives run percentage data from the variable compressor 112' and recalculates the run percentage in light of the input or demand.

The control module receives either instantaneous suction pressure data from the variable compressor 112' or may receive "filtered" suction pressure data. As shown in FIG. 9, the input to the controller 132 may be alternatively linked to a filtered suction pressure reading. The filtered suction pressure reading allows the controller 132 to receive an average of suction pressure for the variable compressor 112' over a user-defined time. The suction pressure, or average suction pressure for a filtered arrangement, is compared to system demand by the controller 132 to determine a run percentage for the variable compressor 112' and whether to initiate the fixed compressors 112. Therefore, the run percentage of the variable compressor 112' essentially controls operation of the fixed compressors 112.

At this point, the variable compressor 112' runs at the run percentage prescribed by the controller 132 based on current system conditions and current run percentage of the compressor 112'. However, when the system requires additional capacity, the variable compressor 112' will increase its run percentage (i.e., between ten percent and one hundred percent total capacity) in response to additional demand. Once the variable compressor 112' runs at one hundred percent capacity for a predetermined time, the controller 132 will instruct a fixed compressor 112 to initiate and will concurrently reduce the run percentage of the variable compressor 112'.

In initiating the fixed compressor(s) 112, the controller 132 will first determine the sizes of the respective fixed compressors 112 so that the smallest of the group may be initiated first. As can be appreciated, the controller 132 attempts to maximize the efficiency of the system 10, 110 and therefore only wants to initiate an appropriately-sized compressor 112. In most cases, the additional capacity required is relatively small and therefore, the controller 132 searches for the smallest-capacity compressor 112 to initiate. However, in some instances, the controller 132 will initiate the larger of the fixed compressors 112 when a significant increase in capacity is required by the system (i.e., such as following a defrost cycle or following a pull-down mode).

Figure 12:
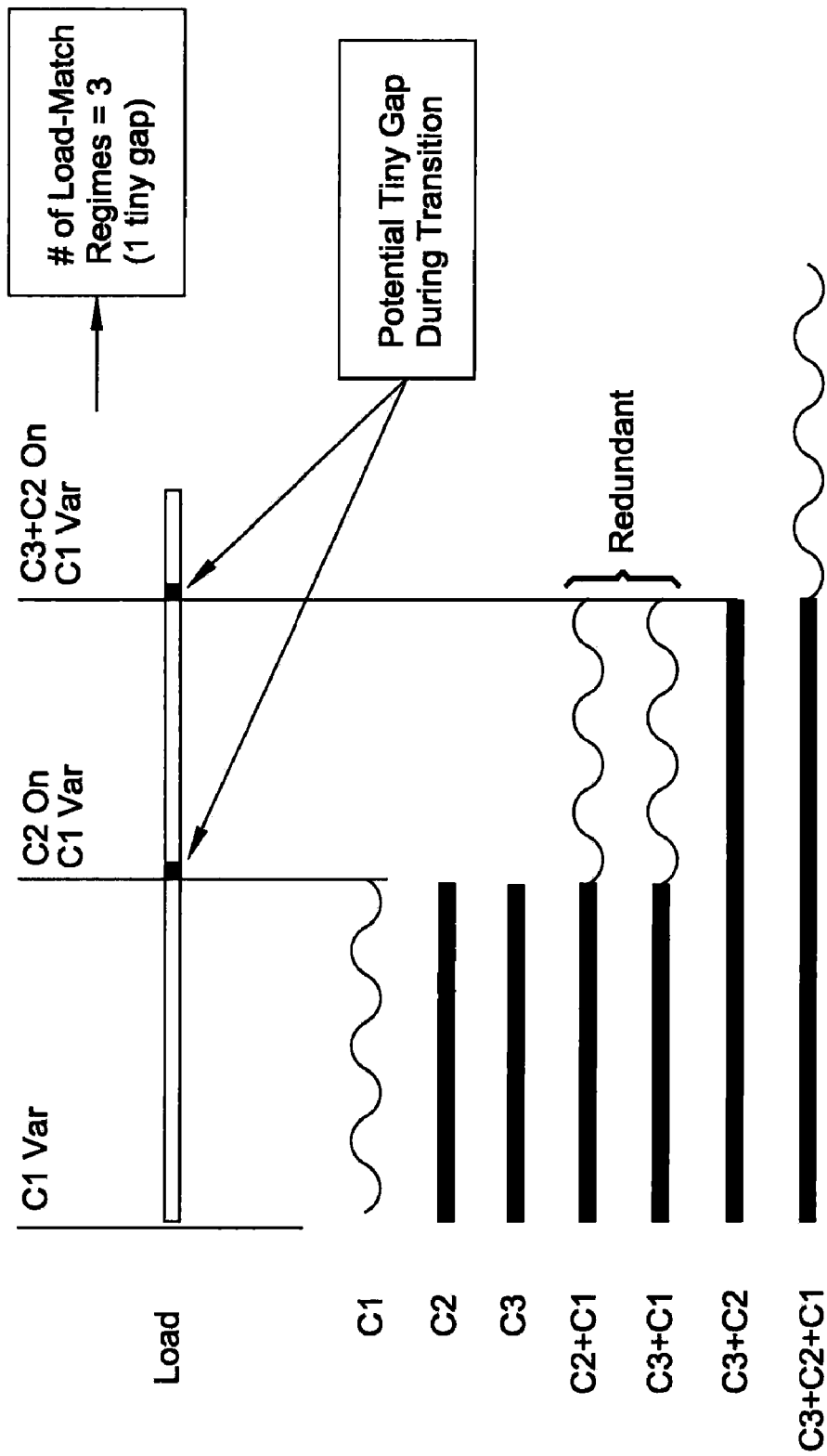
FIG. 12 is a graphical representation illustrating capacity steps versus load for a variable compressor and a plurality of equal-capacity, fixed compressors.

If the compressors are "even" such that each fixed compressor 112 is essentially the same, the controller 132 may select either of the fixed compressors 112 for use with the variable compressor 112' as illustrated in FIG. 12. However, if the fixed compressors 112 carry varying capacities, such that the compressors 112 are "uneven," the controller 132 will choose the smallest-rated compressor of the group, as previously discussed.

Once the fixed compressor 112 is chosen, the fixed compressor 112 is delayed slightly from initiation to allow the variable compressor 112' to reduce its capacity from one hundred percent to a lesser amount. As previously discussed, the amount the variable compressor 112' is reduced is largely based on the system demand and the size and capacity of the fixed compressor 112 to be initiated. Because the fixed compressor 112 includes a fixed capacity and can only run at one hundred percent capacity, the variable compressor 112' must make up for a deficiency between a desired demand and the output of the fixed compressor 112. For example, if the fixed compressor 112 is a four horsepower compressor and the demand calls for seven horsepower, a six horsepower variable compressor 112' will run at fifty percent total capacity to make up for the deficiency in capacity between the fixed compressor 112 and the requisite demand.

The delay associated with initiation of the fixed compressor 112 is instituted to allow time for the variable compressor 112' to come down from one hundred percent capacity operation to fifty percent capacity operation. The goal of the controller 132 is to initiate the fixed compressor 112 such that the fixed compressor 112 is operating at one hundred percent capacity just as the variable compressor 112' reaches fifty percent capacity. At this point, system efficiency and compressor capacity are optimized.

The run percentage of the variable compressor 112' is fed back to the controller 132 for comparison to system demand. The controller 132 uses PID or "fuzzy logic" to continually update the run percentage of the variable compressor 112' in light of the requisite demand. If the variable compressor 112' has run at one hundred percent capacity for a predetermined amount of time, the controller 132 will initiate a fixed compressor 112, as previously discussed. However, if the variable compressor 112' has run at ten percent capacity for a predetermined amount of time, the controller 132 will shutdown the fixed compressor 112 to adjust the overall capacity of the system.

The fixed compressor 112 is shutdown while the variable compressor 112' is ramped up. Because the variable compressor 112' takes some time to ramp up to a higher capacity, the fixed compressor 112 is not shutdown until the variable compressor 112' increases capacity. In other words, the shutdown of the fixed compressor 112 is delayed such that the fixed compressor 112 reaches zero percent capacity as the variable compressor 112' reaches a desired run percentage.

For example, if the demand is three horsepower and a six horsepower variable compressor 112' is at ten percent and a four horsepower fixed compressor is at one hundred percent, the controller 132 will increase the percentage of the variable compressor to fifty percent and will shut down the fixed compressor such that the provided capacity meets demand. Again, the shutdown of the fixed compressor 112 is delayed such that the fixed compressor 112 reaches zero percent capacity as the variable compressor 112' reaches a desired run percentage. At this point, system efficiency and compressor capacity are optimized.

A vapor injection system may be used with any of the foregoing compressors 112, 112' as a further control for optimizing compressor efficiency. The vapor injection system utilizes vaporized refrigerant at a substantially higher pressure to allow each compressor to compress this pressurized refrigerant to its normal output pressure while passing it through only a portion of the compressor 112, 112'. Therefore, the vapor injection system improves the capacity of each individual compressor 112, 112' and is preferably of the type disclosed in assignee's commonly-owned U.S. Pat. Application No. 60/528,157, filed on Dec. 9, 2003, the disclosure of which is incorporated herein by reference.

The compressor control system 200 may use a vapor injection system to improve the capacity of each compressor 112, 112' prior to initiation of a fixed compressor 112 or an increase in run percentage for a variable compressor 112'. For example, if a variable compressor 112' is at one hundred percent capacity for a predetermined amount of time, the controller 132 will have the option of initiating a fixed compressor 112 to provide additional capacity, or may be able to simply initiate a vapor injection system. The vapor injection system may provide just enough additional capacity to the variable compressor 112' (via an increase in compressor efficiency) and may obviate the need to initiate a fixed compressor 112.

With reference to FIG. 10, a table showing experimental data is provided. The table reflects the ability of the compressor control system 200 to optimize system efficiency by controlling fixed compressors 112 based on the run percentage of a variable compressor 112'. The table illustrates the efficiencies gained by modulating the variable compressor 112' between zero percent and one hundred percent and only initiating a fixed compressor 112 when the variable compressor 112' sustains one hundred percent capacity for a predetermined amount of time. In other words, controlling the fixed compressors 112 based on the run percentage of the variable compressor 112' results in improved system efficiency and optimization.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A controller for a system having at least one variable-capacity, pulse-width modulated compressor and at least one fixed-capacity compressor, said controller comprising:
processing circuitry operable to modulate the at least one variable-capacity, pulse-width modulated compressor to any capacity substantially between ten percent capacity and one hundred percent capacity, said processing circuitry determining a desired capacity of the at least one variable capacity, pulse-width modulated compressor based on a load sensor signal and a current run percentage of the at least one variable capacity, pulse-width modulated compressor and operable to toggle the at least one fixed-capacity compressor between a run mode and a shutdown mode based on said desired capacity of the at least one variable-capacity, pulse-width modulated compressor, said processing circuitry toggling the at least one fixed-capacity compressor into the run mode when the desired capacity of the at least one variable-capacity, pulse-width modulated compressor is at one hundred percent capacity for a first predetermined time.

2. The controller of claim 1, further comprising a module detecting compressor operating conditions.

3. The controller of claim 2, wherein said module is operable to communicate said compressor operating conditions to said processing circuitry.

4. The controller of claim 2, wherein said compressor operating conditions include an operating state of the at least one fixed-capacity compressor selected from the group comprising a run mode and a shutdown mode.

5. The controller of claim 4, wherein said compressor operating conditions include a suction pressure of the at least one variable-capacity, pulse-width modulated compressor.

6. The controller of claim 2, wherein said module monitors the variable-capacity, pulse-width modulated compressor for a second predetermined time to ensure that said compressor operating conditions are indicative of true compressor operating conditions.

7. The controller of claim 6, wherein said second predetermined time is approximately equal to a duty cycle of the variable-capacity, pulse-width modulated compressor.

8. The controller of claim 1, wherein said processing circuitry uses proportional-integral-derivative control or fuzzy logic to determine said current run percentage of the at least one variable-capacity, pulse-width modulated compressor.

9. The controller of claim 1, wherein said current run percentage is a run percentage of the at least one variable-capacity, pulse-width modulated compressor and said modulation is based on a comparison of said run percentage to a set point.

10. The controller of claim 9, wherein said set point is a suction-pressure set point.

11. The controller of claim 1, wherein said processing circuitry delays entry of the at least one fixed-capacity compressor into said run mode to allow the at least one variable-capacity, pulse-width modulated compressor to achieve said desired capacity.

12. The controller of claim 1, wherein said processing circuitry delays entry of the at least one fixed-capacity compressor into said shutdown mode to allow the at least one variable-capacity, pulse-width modulated compressor to achieve said desired capacity.

13. The controller of claim 1, wherein said processing circuitry times entry of the at least one fixed-capacity compressor into said run mode and said shutdown mode with the at least one variable-capacity, pulse-width modulated compressor achieving said desired capacity.

14. The controller of claim 1, wherein said processing circuitry said processing circuitry toggling the at least one fixed-capacity compressor into the shutdown mode when the desired capacity of the at least one pulse-width modulated compressor is at ten percent capacity for a second predetermined time.

* * * * *

UNITED STATES PATENT AND TRADEMARK OFFICE
CERTIFICATE OF CORRECTION

PATENT NO. : 8,287,230 B2  
APPLICATION NO. : 12/885778  
DATED : October 16, 2012  
INVENTOR(S) : Ernest P. Hurst, Jr. et al.

Page 1 of 1

It is certified that error appears in the above-identified patent and that said Letters Patent is hereby corrected as shown below:

In the Specifications:

| | |
|---|---|
| Column 1, Line 15 | After "relate" delete "to". |
| Column 3, Line 39 | After "is" insert --a--. |
| Column 9, Line 2 | "(no shown)" should read --(not shown)--. |
| Column 10, Line 34 | "such as situation" should be --such a situation--. |

Signed and Sealed this  
Eighteenth Day of June, 2013

Teresa Stanek Rea  
*Acting Director of the United States Patent and Trademark Office*